(12) United States Patent
Hwang et al.

(10) Patent No.: US 11,858,381 B2
(45) Date of Patent: Jan. 2, 2024

(54) SLIDING DEVICE FOR VEHICLE

(71) Applicants: Hyundai Motor Company, Seoul (KR); Kia Corporation, Seoul (KR); Yong San Co., Ltd., Ulsan (KR)

(72) Inventors: Jin Ho Hwang, Cheonan-Si (KR); Sang Heon Lee, Seoul (KR); Dong Eun Cha, Hwaseong-Si (KR); Choon Taik Kim, Yongin-Si (KR); Hyung Jin Kim, Seoul (KR); Sang Hoon Lee, Ansan-Si (KR)

(73) Assignees: Hyundai Motor Company, Seoul (KR); Kia Corporation, Seoul (KR); Yong San Co., Ltd., Ulsan (KR)

( * ) Notice: Subject to any disclaimer, the term of this patent is extended or adjusted under 35 U.S.C. 154(b) by 53 days.

(21) Appl. No.: 17/843,144

(22) Filed: Jun. 17, 2022

(65) Prior Publication Data
US 2023/0105498 A1  Apr. 6, 2023

(30) Foreign Application Priority Data
Oct. 6, 2021  (KR) .................... 10-2021-0132577

(51) Int. Cl.
*B60N 2/00* (2006.01)
*B60N 2/07* (2006.01)
*B60N 2/08* (2006.01)
*B60N 2/90* (2018.01)

(52) U.S. Cl.
CPC ............ *B60N 2/0722* (2013.01); *B60N 2/08* (2013.01); *B60N 2002/952* (2018.02)

(58) Field of Classification Search
None
See application file for complete search history.

(56) References Cited

U.S. PATENT DOCUMENTS

| | | | |
|---|---|---|---|
| 7,614,597 B2 * | 11/2009 | Matsumoto | B60N 2/0818 296/65.13 |
| 9,219,359 B2 | 12/2015 | Sekino et al. | |
| 9,381,876 B2 | 7/2016 | Terada et al. | |
| 9,573,536 B2 | 2/2017 | Katou et al. | |

(Continued)

FOREIGN PATENT DOCUMENTS

| | | |
|---|---|---|
| JP | 2021-037880 | 3/2021 |
| JP | 2021-079795 | 5/2021 |

(Continued)

*Primary Examiner* — Steven M Marsh
(74) *Attorney, Agent, or Firm* — MORGAN, LEWIS & BOCKIUS LLP

(57) ABSTRACT

A sliding device configured for a vehicle, includes a magnetic module configured to slide on a floor of the vehicle and be fixed to the floor by a magnetic force or unfixed from the floor depending on a change in magnetic circuit due to a rotation of a first magnetic body provided in the magnetic module; a plurality of catching portions formed on the floor, spaced from one another, and provided along a movement route of the magnetic module, and fastening portions provided on the magnetic module and configured to be pressed downward by a first elastic body, the fastening portions being configured to mechanically fasten the magnetic module to the floor by being lowered and caught by the catching portions when the fastening portions are matched with the catching portions while the magnetic module moves.

15 Claims, 4 Drawing Sheets

(56) References Cited

U.S. PATENT DOCUMENTS

| | | | |
|---|---|---|---|
| 2018/0215318 A1* | 8/2018 | Abdel Majid | E05B 83/00 |
| 2018/0334054 A1 | 11/2018 | Higuchi et al. | |
| 2020/0346531 A1* | 11/2020 | Dry | B60P 1/6481 |
| 2020/0346564 A1* | 11/2020 | Dry | B60N 2/08 |
| 2021/0170919 A1* | 6/2021 | Tseng | B60N 2/0722 |
| 2022/0212571 A1* | 7/2022 | Plancon | B60N 2/0705 |

FOREIGN PATENT DOCUMENTS

| | | |
|---|---|---|
| KR | 10-0501727 | 7/2005 |
| KR | 10-1419013 | 7/2014 |
| KR | 10-2022-0036707 | 3/2022 |

* cited by examiner

SLIDING DEVICE FOR VEHICLE

CROSS-REFERENCE TO RELATED APPLICATION

The present application claims priority to Korean Patent Application No. 10-2021-0132577, filed Oct. 6, 2021, the entire contents of which is incorporated herein for all purposes by this reference.

BACKGROUND OF THE PRESENT DISCLOSURE

Field of the Present Disclosure

The present disclosure relates to a sliding device for a vehicle, which slides a seat or a table mounted in a vehicle.

Description of Related Art

In general, seats, in which occupants may be accommodated, are provided in an internal space of a vehicle. The seat is configured to be changed in position in a forward/rearward direction in accordance with a body condition of the occupant to provide more comfortable ride quality to the occupant. Alternatively, the seat is configured so that the occupant may arbitrarily change the position of the seat to more efficiently use an internal space when baggage is loaded into the internal space.

A sliding device for a vehicle is provided between the seat and a vehicle body to change the position of the seat as described above. The sliding device for a vehicle typically includes a rail fixed to the vehicle body, a slider connected to the rail and configured to move and fix the seat, a locking piece configured to fix the slider by fastening the slider and the rail, and a mechanical part configured to operate the locking piece. Alternatively, the sliding device for a vehicle may move the slider along the rail by use of an electric motor.

The sliding device for a vehicle in the related art has a problem in that the seat of the vehicle moves on the rail because of malfunction of the electric motor in the event of a vehicle collision. For the present reason, there is a problem in that an additional injury is caused to a passenger.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a sliding device configured for a vehicle, in which a movable member is provided in a vehicle, a seat or a table is coupled to an upper portion of the movable member, the movable member slides along a rail, and a magnetic module is provided to fix the movable member by changing a magnetic circuit in the event of a vehicle collision.

Various aspects of the present disclosure are directed to providing a sliding device configured for a vehicle, the sliding device including: a magnetic module configured to slide on a floor of the vehicle and be fixed to the floor by a magnetic force or unfixed from the floor in accordance with a change in magnetic circuit due to a rotation of a first magnetic body provided in the magnetic module; a plurality of catching portions formed on the floor, spaced from one another, and provided along a movement route of the magnetic module; and at least a fastening portion provided on the magnetic module and configured to be pressed downward by a first elastic body, the at least a fastening portion being configured to fasten the magnetic module to the floor by being lowered and caught by the catching portions when the at least a fastening portion is matched with the catching portions while the magnetic module moves.

The magnetic module may include: a second magnetic body provided in a direction parallel to the floor, spaced apart upwards from the floor, and positioned adjacent to the first magnetic body; and a base plate connected to the fastening portion by the first elastic body, provided above the second magnetic body, provided in parallel with the second magnetic body, configured as a conductor, and coupled to the first magnetic body by the magnetic force, and the second magnetic body may be selectively fixed to the floor by the magnetic force or unfixed from the floor as the magnetic circuit of the first and second magnetic bodies is changed by the rotation of the first magnetic body.

When the first magnetic body is rotated and a magnetic pole of the first magnetic body and a magnetic pole of the second magnetic body, which have opposite polarities, are provided to face each other, the magnetic circuit may be formed by the first magnetic body, the second magnetic body, and the base plate, and the second magnetic body may be unfixed from the floor.

The sliding device may further include a second elastic body configured to press the fastening portion and the magnetic module upward to move the fastening portion and the magnetic module upward in a state in which the second magnetic body is unfixed from the floor.

When the first magnetic body is rotated and a magnetic pole of the first magnetic body and a magnetic pole of the second magnetic body, which have same polarities, are provided to face each other, the magnetic circuit may be formed by the first magnetic body, the second magnetic body, the base plate, and a rail, and the second magnetic body may be fixed to the floor by the magnetic force.

The fastening portion and the catching portion may have various shapes corresponding to one another.

The sliding device may further include: a rail provided on the floor of the vehicle to extend in a longitudinal direction of the floor and including a guide unit formed in a direction in which the rail extends, the rail including the plurality of catching portions spaced from one another in the longitudinal direction thereof; and a movable member coupled to an upper portion of the rail and configured to be slid by an actuator in a direction in which the guide unit extends, in which the magnetic module is coupled to a lower side of the movable member and fixed to the rail by the magnetic force or unfixed from the rail, and the first elastic body is positioned between the movable member and the fastening portion and presses the fastening portion downward.

The actuator may include: a motor including a rotation shaft configured to rotate; and a roller connected to the rotation shaft of the motor to be in contact with the rail and configured to rotate in a direction in which the guide unit extends to move the movable member.

The sliding device may further include: a coupling portion protruding upwards from the movable member and configured to be coupled; and a rail cover configured to surround the rail and the movable member and including a slit along which the coupling portion moves in a longitudinal direction of the rail.

A seat or a table may be coupled to an upper side of the coupling portion.

The rail may be bent at an end portion thereof in a direction that intersects the longitudinal direction, and the movable member may move along the bent rail.

According to the sliding device configured for a vehicle according to an exemplary embodiment of the present disclosure, the magnetic module is fixed to or unfixed from the floor in accordance with the change in magnetic circuit, and the magnetic module may slide when the magnetic module is unfixed. The fastening portion is moved downwards by the first elastic body that presses the fastening portion downward to fix the magnetic module, and the plurality of catching portions are formed on the floor and configured to be fastened to the fastening portion. The plurality of catching portions is spaced from one another in the direction in which the magnetic module slides. Therefore, the magnetic module may be fixed by the fastening portion and the catching portion. In a case in which the fastening portion and the catching portion are not matched with each other in the state in which the magnetic module is fixed to the floor, the fastening portion is moved when the inertia occurs on the magnetic module because of external impact applied to the vehicle so that the fastening portion is matched with the catching portion, the catching portion and the fastening portion are fastened, and the magnetic module may be fixed. Therefore, the seat or the table connected to the magnetic module may be fixed without moving even though the external impact is applied suddenly. As a result, it is possible to prevent a secondary injury caused by a movement of the seat or the table in the vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
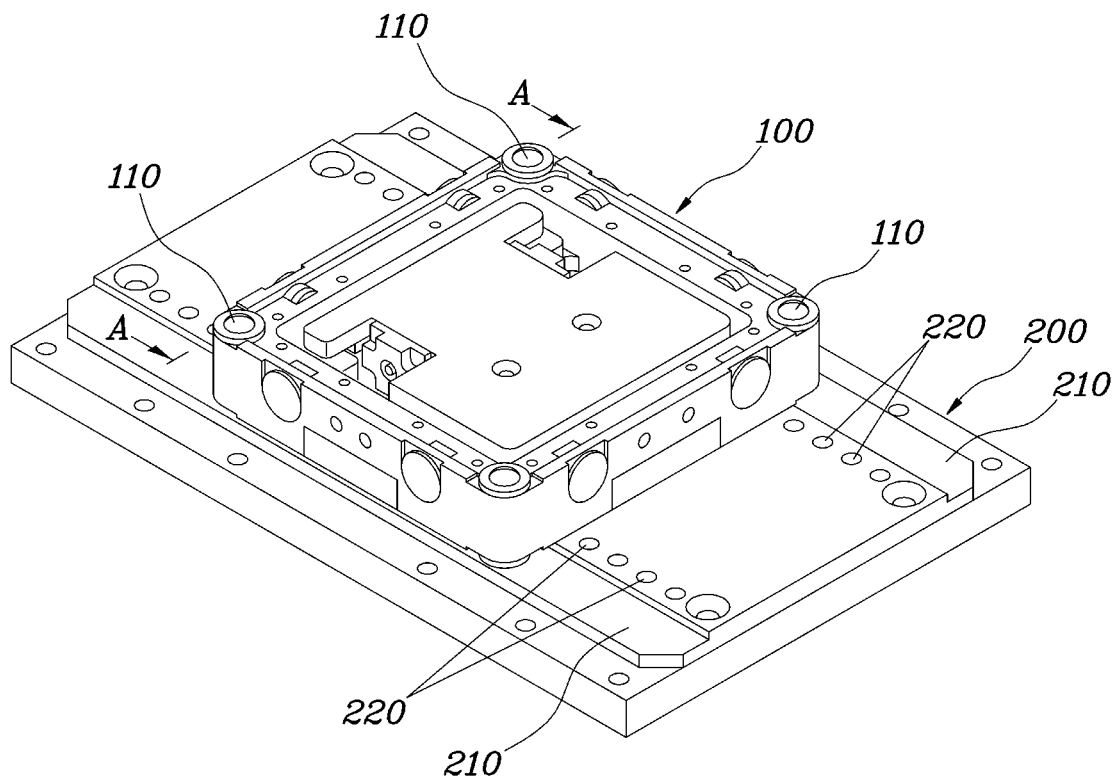
FIG. 1 is a perspective view of a sliding device configured for a vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions of embodiments of the present disclosure disclosed in the exemplary embodiment or application are exemplified only for the purpose of explaining the embodiments according to an exemplary embodiment of the present disclosure, the exemplary embodiments of the present disclosure may be carried out in various forms, and it should not be interpreted that the present disclosure is limited to the embodiments described in the exemplary embodiment or application.

Because the exemplary embodiments of the present disclosure may be variously changed and may have various forms, specific embodiments will be illustrated in the drawings and described in detail in the exemplary embodiment or application. However, the descriptions of the specific embodiments are not intended to limit embodiments according to the concept of the present disclosure to the specific embodiments, but it should be understood that the present disclosure covers all modifications, equivalents and alternatives falling within the spirit and technical scope of the present disclosure.

The terms such as "first," "second," and other numerical terms may be used herein only to describe various elements, but these elements should not be limited by these terms. These terms are used only for the purpose of distinguishing one constituent element from other constituent elements. For example, without departing from the scope according to the concept of the present disclosure, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or directly connected to another constituent element, and an intervening constituent element can also be present between the constituent elements. When one constituent element is described as being "directly coupled to" or "directly connected to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the present specification are used to just describe a specific embodiment and do not intend to limit the present disclosure. Singular expressions include plural expressions unless clearly described as different meanings in the context In the present specification, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which an exemplary embodiment of the present disclosure pertains. The terms such as those defined in a commonly used dictionary should be interpreted as having meanings consistent with meanings in the context of related technologies and should not be interpreted as ideal or excessively formal meanings unless explicitly defined in the present specification.

Hereinafter, the present disclosure will be described in detail through DETAILED DESCRIPTION of the present disclosure with reference to the accompanying drawings. Like reference numerals indicated in the respective drawings refer to like members.

Figure 2:
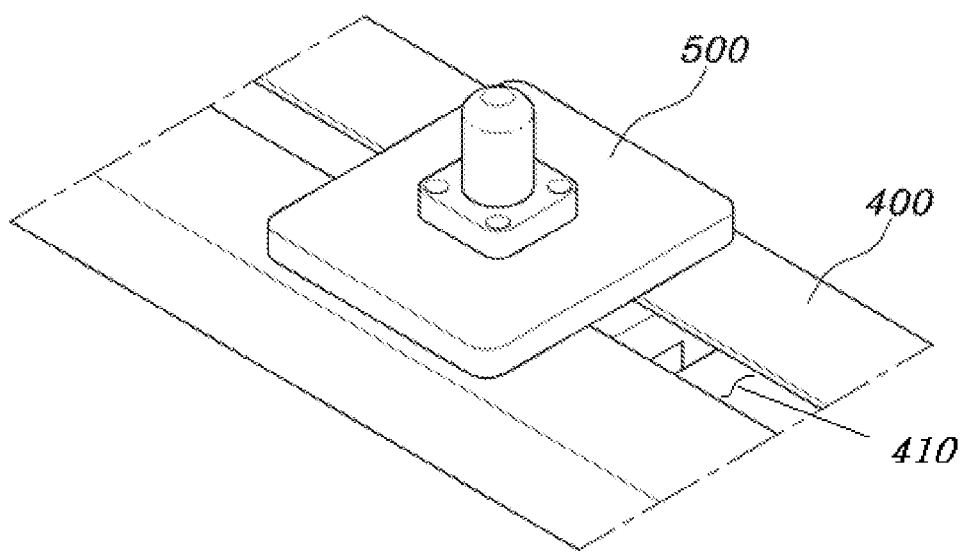
FIG. 2 is a perspective view exemplarily illustrating a state in which a rail cover is mounted on a rail of the sliding device configured for a vehicle according to the exemplary embodiment of the present disclosure.
Figure 3:
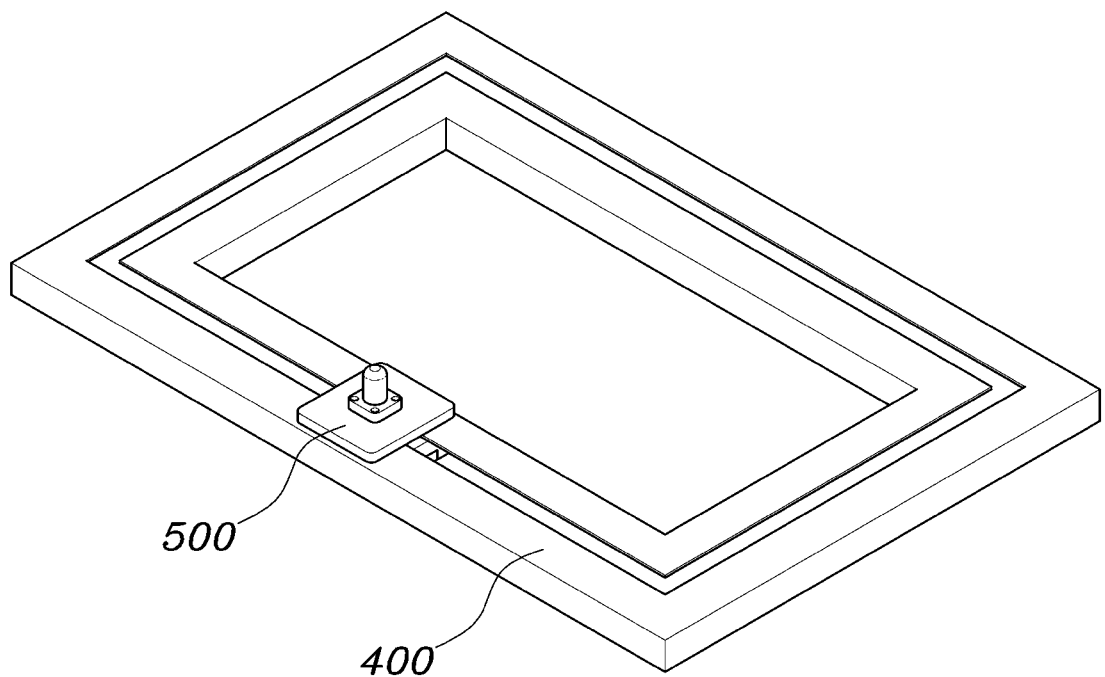
FIG. 3 is a view exemplarily illustrating various embodiments of the rail of the sliding device configured for a vehicle according to the exemplary embodiment of the present disclosure.
Figure 4:
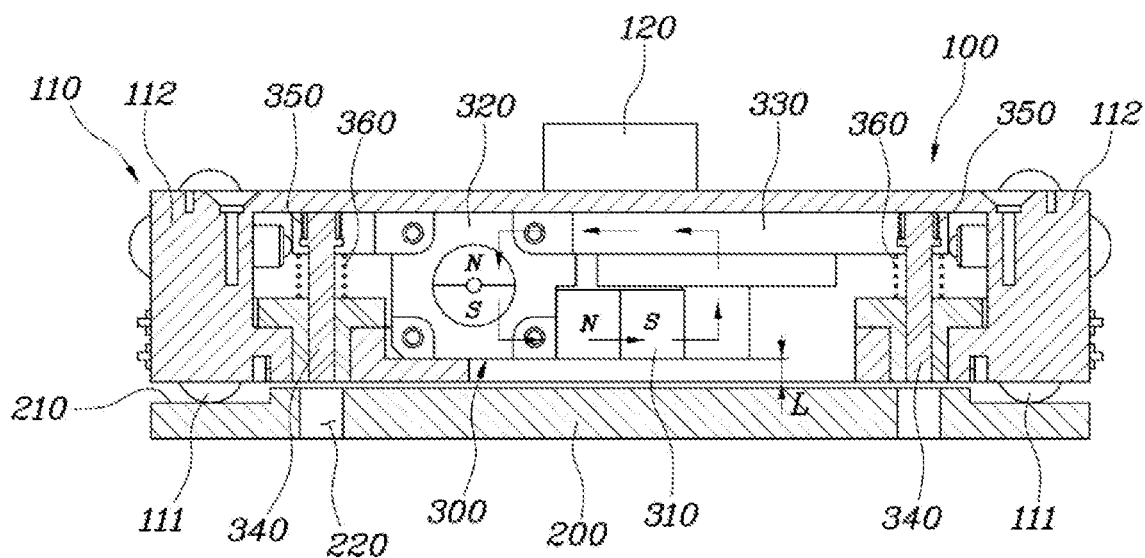
FIG. 4 and FIG. 5 are cross-sectional views taken along line A-A in FIG. 1 and illustrating an operation of a magnetic module.
Figure 5:
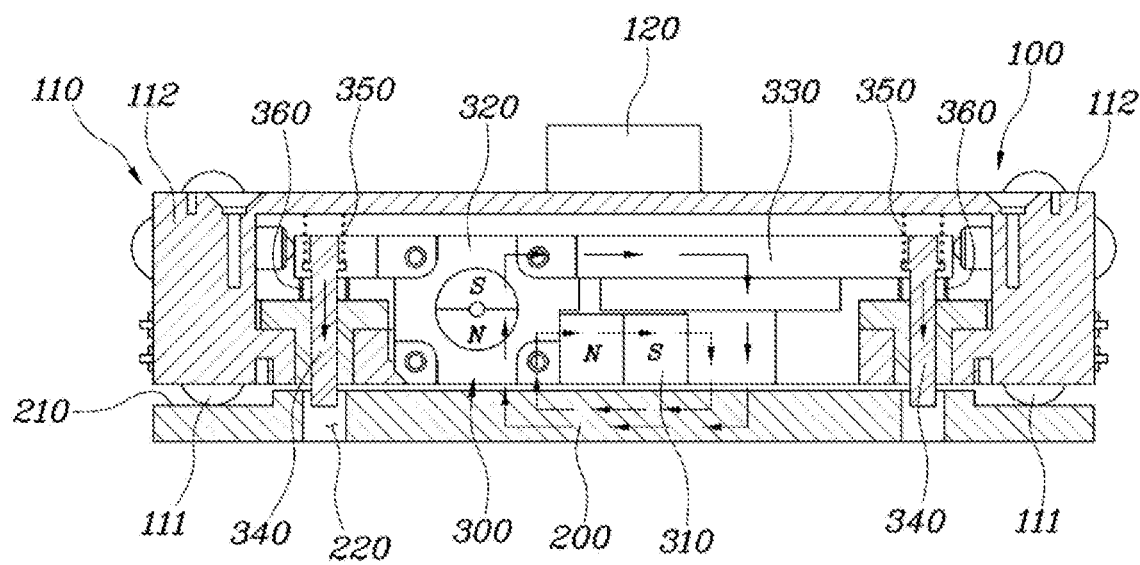

FIG. 1 is a perspective view of a sliding device configured for a vehicle according to various exemplary embodiments of the present disclosure, FIG. 2 is a perspective view exemplarily illustrating a state in which a rail cover 400 is mounted on a rail 200 of the sliding device configured for a vehicle according to the exemplary embodiment of the present disclosure, FIG. 3 is a view exemplarily illustrating various embodiments of the rail 200 of the sliding device configured for a vehicle according to the exemplary embodiment of the present disclosure, and FIG. 4 and FIG. 5 are cross-sectional views taken along line A-A in FIG. 1 and illustrating an operation of a magnetic module 300.

Figure 6:
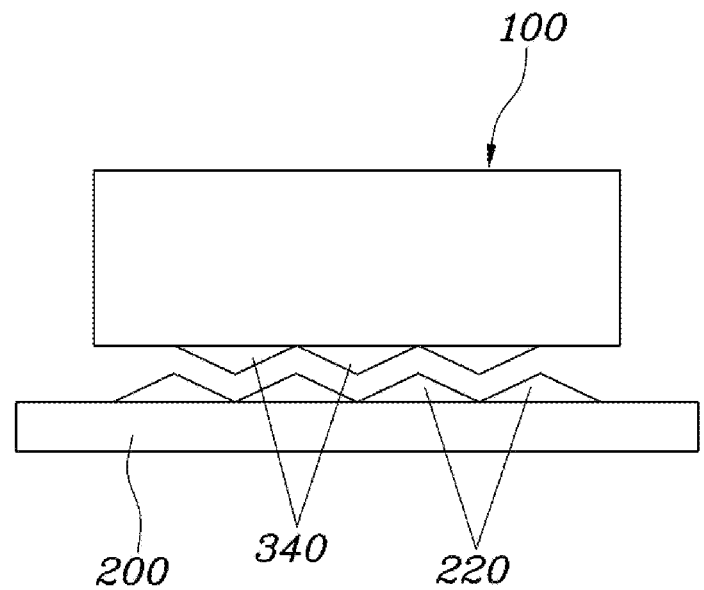
FIG. 6 and FIG. 7 are views exemplarily illustrating various embodiments of fastening portions according to the exemplary embodiment of the present disclosure.
Figure 7:
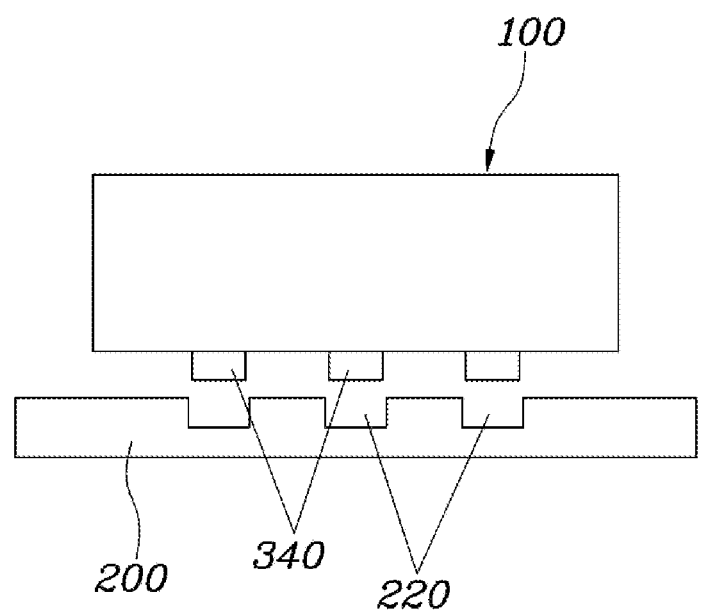

FIG. 6 and FIG. 7 are views exemplarily illustrating various embodiments of fastening portions 340 according to the exemplary embodiment of the present disclosure.

An exemplary embodiment of the sliding device configured for a vehicle according to an exemplary embodiment of the present disclosure will be described with reference to FIGS. 1 to 7.

The sliding device may be provided below a seat or a table to move the seat or the table mounted on a floor of the vehicle.

The sliding device may be operated manually or by electric power. The sliding device may be fixed after moving. There is a problem in that the sliding device is unfixed by the inertia of the seat or the table in the event of an external collision of the vehicle, which causes a secondary injury to a passenger. The present disclosure is devised to solve the present problem.

The sliding device configured for a vehicle according to various exemplary embodiments of the present disclosure may include a magnetic module 300 configured to slide on the floor of the vehicle and be fixed to the floor by a magnetic force or unfixed from the floor depending on a change in a magnetic circuit due to a rotation of a first magnetic body 320 provided in the magnetic module 300; a plurality of catching portions 220 formed on the floor, spaced from one another, and provided along a movement route of the magnetic module 300; and fastening portions 340 provided on the magnetic module 300 and configured to be pressed downward by first elastic bodies 350, the fastening portions 340 being configured to mechanically fasten the magnetic module 300 to the floor by being lowered and caught by the catching portions 220 when the fastening portions 340 are matched with the catching portions 220 while the magnetic module 300 moves.

Referring to FIGS. 1, 4 and 5, the magnetic module 300 is slidably provided on the floor. The first magnetic body 320 is rotatably provided in the magnetic module 300. The magnetic circuit is changed as the first magnetic body 320 rotates after the seat is moved so that the magnetic module 300 is coupled to the floor by the magnetic force. The magnetic circuit is changed as the first magnetic body 320 rotates while the seat or the table is moved by the passenger so that the magnetic module 300 may be uncoupled from the floor.

The first elastic body 350 is positioned above the fastening portion 340 and presses the fastening portion 340 downward by applying an elastic force. The first elastic body 350 may move the fastening portion 340 downward when the first magnetic body 320 of the magnetic module 300 rotates and the magnetic circuit changes so that the magnetic module 300 is moved downwards and fixed to the floor by the magnetic force.

The catching portion 220 may be formed on the floor and correspond to the fastening portion 340 so that the fastening portion 340 is caught by the catching portion 220 when the fastening portion 340 is moved downward.

However, the magnetic module 300 may not be fixed when the fastening portion 340 is pressed downward by the first elastic body 350 in a state in which the fastening portion 340 is not matched with the catching portion 220 in the state in which the magnetic module 300 is fixed to the floor. In the instant state, when the inertia, which is equal to or greater than a frictional force, occurs to a degree to which the magnetic module 300 fixed by the magnetic force is moved, the fastening portion 340, which is pressed downward by the first elastic body 350, is moved to be matched with the catching portion 220 so that the magnetic module 300 may be fixed.

Therefore, in a case in which the fastening portion 340 and the catching portion 220 are not matched with each other in the state in which the magnetic module 300 is fixed to the floor, the fastening portion 340 is moved when the inertia occurs on the magnetic module 300 because of external impact applied to the vehicle so that the fastening portion 340 is matched with the catching portion 220, the catching portion 220 and the fastening portion 340 are fastened, and the magnetic module 300 may be fixed. Therefore, the seat or the table connected to the magnetic module 300 may be fixed without moving even though the external impact is applied suddenly. As a result, it is possible to prevent a secondary injury caused by a movement of the seat or the table in the vehicle.

Furthermore, in the exemplary embodiment of the present disclosure, the catching portion 220 formed on the floor is provided in a form of a through-hole formed in an upward/downward direction. The plurality of catching portions 220 is provided and spaced from one another at predetermined intervals in a direction in which the magnetic module 300 slides. A protruding portion may be shaped to extend downwardly from the magnetic module 300.

To fix the magnetic module 300 to the floor, the fastening portion 340 in a form of a protrusion is inserted into the catching portion 220 when the fastening portion 340 is matched with the catching portion 220 so that the magnetic module 300 is fixed. In a case in which the fastening portion 340 is not matched with the catching portion 220, the fastening portion 340 is pressed downward by the first elastic body 350 and kept in contact with the floor. When the magnetic module 300 is moved by an external force, the fastening portion 340 may be inserted into the catching portion 220 to prevent the magnetic module 300 from sliding.

In the following embodiment of the magnetic module 300, the magnetic module 300 includes: a second magnetic body 310 provided in a direction parallel to the floor, spaced apart upwards from the floor, and positioned adjacent to the first magnetic body 320; and a base plate 330 connected to the fastening portions 340 by the first elastic bodies 350, provided above the second magnetic body 310, provided in parallel with the second magnetic body 310, configured as a conductor, and coupled to the first magnetic body 320 by the magnetic force. As the magnetic circuit of the first and second magnetic bodies 320 and 310 is changed by the rotation of the first magnetic body 320, the second magnetic body 310 may be selectively fixed to the floor by the magnetic force or unfixed from the floor.

Referring to FIG. 4 and FIG. 5, the first magnetic body 320 is provided so that an N-pole and an S-pole thereof are rotatable. The second magnetic body 310 is mounted adjacent to the first magnetic body 320 and including an N-pole and an S-pole provided in the direction parallel to the floor. The base plate 330 is provided above the second magnetic body 310 and connected to the first magnetic body 320 and the second magnetic body 310, and a magnetic field may flow through the base plate 330. When the magnetic poles of the first and second magnetic bodies 320 and 310, which face each other, are changed by the rotation of the first magnetic body 320, the magnetic circuit is changed so that the second magnetic body 310 may be fixed to or unfixed from the floor.

Therefore, the magnetic module 300 may be selectively fixed to or unfixed from the floor. Therefore, the magnetic module 300 is unfixed to move the seat or the table. The first magnetic body may be rotated to fix the magnetic module 300, fixing the seat or the table.

When the first magnetic body 320 is rotated and the magnetic pole of the first magnetic body 320 and the magnetic pole of the second magnetic body 310, which have opposite polarities, are provided to face each other, the magnetic circuit is formed by the first magnetic body 320, the second magnetic body 310, and the base plate 330, the second magnetic body 310 may be unfixed from the floor (the rail 200).

As illustrated in FIG. 4, when the magnetic poles of the first and second magnetic bodies 320 and 310, which face each other, have opposite polarities, the magnetic circuit is formed in a direction from the N-pole of the first magnetic body 320 to the S-pole of the second magnetic body 310, and the magnetic circuit is formed to pass through the base plate 330 and lead to the S-pole of the first magnetic body 320.

The magnetic circuit is indicated by the arrows illustrated in FIG. 4.

Therefore, the second magnetic body 310 may be unfixed from the floor (the rail 200).

The sliding device may further include second elastic bodies 360 configured to press the fastening portions 340 and the magnetic module 300 upward to move the fastening portions 340 and the magnetic module 300 upward in the state in which the second magnetic body 310 is unfixed from the floor.

As illustrated in FIG. 4, the second elastic body 360 is provided to press the base plate and the fastening portion 340 so that the second magnetic body 310, together with the fastening portion, is moved upward by a spacing distance L in the state in which the second magnetic body 310 is unfixed from the floor (the rail 200). The second elastic body 360 may prevent the second magnetic body 310 from being brought into contact with the floor by its own weight and sliding on the floor in the state in which the magnetic module 300 is not fixed to the floor, preventing damage to the second magnetic body 310. The second elastic body 360 may separate the fastening portion 340 from the catching portion 220.

When the first magnetic body 320 is rotated and the magnetic pole of the first magnetic body 320 and the magnetic pole of the second magnetic body 310, which have the same polarity, are provided to face each other, the magnetic circuits are formed by the first magnetic body 320, the second magnetic body 310, the base plate 330, and the rail 200 so that the second magnetic body 310 may be fixed to the floor by the magnetic force.

As illustrated in FIG. 5, when the magnetic poles of the first and second magnetic bodies 320 and 310, which face each other, have the same polarities, the magnetic field enters the S-pole of the first magnetic body 320 from the N-pole of the first magnetic body 320 through the base plate 330 and the floor so that the second magnetic body 310 is fixed to the floor by the magnetic force. Therefore, the magnetic module 300 may be doubly fixed to the floor by the magnetic force.

The magnetic circuits are indicated by the arrows illustrated in FIG. 5.

Therefore, the second magnetic body 310 may be fixed to the floor (the rail 200).

The elastic force of the second elastic body 360 may be higher than the elastic force of the first elastic body 350. The fastening portions 340 and the base plate may be moved upward as the first elastic body 350 is compressed by elasticity of the second elastic body 360 in the state in which the second magnetic body 310 is unfixed from the floor (the rail 200). To fix the second magnetic body 310 to the floor (the rail 200), the second elastic body 360 may be compressed by the magnetic force, and the first elastic body 350 may press the fastening portion 340 downward.

The fastening portion 340 and the catching portion 220 may have various shapes corresponding to one another.

In an exemplary embodiment of the present invention, the first and second magnetic bodies 320 and 310 are permanent magnets.

As illustrated in FIG. 5 and FIG. 6, the fastening portion 340 may have various shapes. Therefore, the catching portion 220 may also have a shape corresponding to the shape of the fastening portion 340 so that the fastening portion 340 is coupled to and caught by the catching portion 220.

The shape of the fastening portion 340 and the shape of the catching portion 220 may be designed by a designer so that the fastening portion 340 is coupled to and caught by the catching portion 220 to increase a fastening force.

The sliding device may further include the rail 200 provided on the floor of the vehicle to extend in a longitudinal direction and including a guide unit 210 formed in a direction in which the rail 200 extends, the rail 200 including the plurality of catching portions 220 spaced from one another in the longitudinal direction; and a movable member 100 coupled to an upper portion of the rail 200 and configured to be slid by actuators 110 in a direction in which the guide unit 210 extends. The magnetic module 300 is coupled to a lower side of the movable member 100 and fixed to the rail 200 by the magnetic force or unfixed from the rail 200. The first elastic body 350 may be positioned between the movable member 100 and the fastening portion 340 and press the fastening portion 340 downward.

As illustrated in FIG. 1, FIG. 2, FIG. 3, FIG. 4, and FIG. 5, the actuator 110 may be provided to slide the movable member 100 coupled to an upper side of the magnetic module 300 and configured to cover the magnetic module 300. The rail 200 may be provided on the floor, and the plurality of catching portions 220 may be provided in the direction in which the rail 200 extends.

Furthermore, the rail 200 may have the guide unit 210 provided in the direction in which the rail 200 extends. The movable member 100 and the magnetic module 300 coupled to the movable member 100 may be moved by the operation of the actuator 110 in the direction in which the guide unit 210 extends.

Therefore, the movable member 100 may protect the magnetic module 300 while surrounding the magnetic module 300 and slide the magnetic module 300.

The actuator 110 may include a motor 112 including a rotation shaft, and a roller 111 connected to the rotation shaft of the motor 112 to be in contact with the rail 200 and configured to rotate in the direction in which the guide unit 210 extends to move the movable member 100.

The actuator 110 operates to move the movable member 100 on the rail 200. The actuator 110 may include the motor 112 that operates by receiving electric power. The actuator 110 may include the roller 111 connected to the rotation shaft of the motor 112, and the roller 111 is in contact with the guide unit 210 and rotates in the direction in which the guide unit 210 extends.

Therefore, the movable member may move in the direction in which the rail 200 extends.

The sliding device may further include: a coupling portion 120 protruding upwards from the movable member 100 and configured to be coupled; and a rail cover 400 configured to surround the rail 200 and the movable member 100 and including a slit 410 along which the coupling portion 120 may be moved in the longitudinal direction of the rail 200.

The movable member 100 may have the coupling portion 120 protruding upwards from the movable member 100 so that the seat or the table, which is an internal component of the vehicle required to slide, may be connected to the coupling portion 120.

The rail cover 400 may be formed to surround an external side of the rail 200 to prevent foreign substances from entering the rail 200 and the catching portion 220. The rail cover 400 has the slit 410 formed at an upper side thereof to allow only the coupling portion 120 to move. The coupling portion 120 is moved by the movement of the movable member 100 so that the seat or the table connected to the coupling portion 120 may move.

The seat or the table may be coupled to an upper side of the coupling portion 120.

As illustrated in FIG. 1 and FIG. 2, the coupling portion 120 may be provided to protrude upwards from the movable member 100. A coupling plate 500 is coupled to the upper side of the coupling portion 120, and the internal component such as the seat or the table of the vehicle may be mounted on the coupling plate 500 and moved in the internal space of the vehicle in the direction in which the rail 200 extends.

Therefore, the internal space in the vehicle may be more efficiently used.

The rail 200 may be bent at an end portion thereof in a direction that intersects the longitudinal direction, and the movable member 100 may move along the bent rail 200.

As illustrated in FIG. 3, the rail 200 may have various shapes. The shape of the rail 200 may allow the seat or the table, which is connected and coupled to the movable member 100, to freely move along the rail 200 in the vehicle. When the movable member 100 is stopped, the movable member 100 may be fixed to the floor of the vehicle by the magnetic module 300 and the fastening portions 340.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A sliding apparatus for a vehicle, the sliding apparatus comprising:
   a magnetic module configured to slide on a floor of the vehicle and be fixed to the floor by a magnetic force or unfixed from the floor in accordance with a change in magnetic circuit due to a rotation of a first magnetic body provided in the magnetic module;
   a plurality of catching portions formed on the floor, spaced from one another, and provided along a movement route of the magnetic module; and
   at least a fastening portion provided on the magnetic module and configured to be pressed downward by a first elastic body, the at least a fastening portion being configured to fasten the magnetic module to the floor by being lowered and caught by the catching portions when the at least a fastening portion is matched with the catching portions while the magnetic module moves.

2. The sliding apparatus of claim 1, wherein the magnetic module includes:
   a second magnetic body provided in a direction parallel to the floor, spaced apart upwards from the floor, and positioned adjacent to the first magnetic body,
   wherein the second magnetic body is selectively fixed to the floor by the magnetic force or unfixed from the floor as the magnetic circuit of the first and second magnetic bodies is changed by the rotation of the first magnetic body.

3. The sliding apparatus of claim 2, wherein the magnetic module further includes:
   a base plate connected to the at least a fastening portion by the first elastic body, provided above the second magnetic body, provided in parallel with the second magnetic body, configured as a conductor, and coupled to the first magnetic body by the magnetic force.

4. The sliding apparatus of claim 2, wherein a magnetic polarity of the second magnetic body is fixed in a predetermined direction.

5. The sliding apparatus of claim 2, wherein at least one of the first and second magnetic bodies are permanent magnets.

6. The sliding apparatus of claim 3, wherein when the first magnetic body is rotated and a magnetic pole of the first magnetic body and a magnetic pole of the second magnetic body, which have opposite polarities, are provided to face each other, the magnetic circuit is formed by the first magnetic body, the second magnetic body, and the base plate, and the second magnetic body is unfixed from the floor.

7. The sliding apparatus of claim 6, further including:
a second elastic body configured to press the at least a fastening portion and the magnetic module upward to move the at least a fastening portion and the magnetic module upward in a state in which the second magnetic body is unfixed from the floor.

8. The sliding apparatus of claim 7, wherein an elastic force of the second elastic body is higher than an elastic force of the first elastic body.

9. The sliding apparatus of claim 3, wherein when the first magnetic body is rotated and a magnetic pole of the first magnetic body and a magnetic pole of the second magnetic body, which have same polarities, are provided to face each other, the magnetic circuit is formed by the first magnetic body, the second magnetic body, the base plate, and a rail, and the second magnetic body is fixed to the floor by the magnetic force.

10. The sliding apparatus of claim 1, wherein the at least a fastening portion and the plurality of catching portions have shapes corresponding to one another.

11. The sliding apparatus of claim 1, further including:
a rail provided on the floor of the vehicle to extend in a longitudinal direction of the floor and including a guide unit formed in a direction in which the rail extends, the rail including the plurality of catching portions spaced from one another in the longitudinal direction; and
a movable member coupled to an upper portion of the rail and configured to be slid by an actuator in a direction in which the guide unit extends,
wherein the magnetic module is coupled to a lower side of the movable member and fixed to the rail by the magnetic force or unfixed from the rail, and the first elastic body is positioned between the movable member and the at least a fastening portion and presses the at least a fastening portion downward.

12. The sliding apparatus of claim 11, wherein the actuator includes:
a motor configured to rotate; and
a roller coupled to the motor to be in contact with the rail and configured to rotate in a direction in which the guide unit extends to move the movable member.

13. The sliding apparatus of claim 11, further including:
a coupling portion protruding upwards from the movable member and configured to be coupled; and
a rail cover configured to surround the rail and the movable member and including a slit along which the coupling portion moves in a longitudinal direction of the rail.

14. The sliding apparatus of claim 13, wherein a seat or a table is coupled to an upper side of the coupling portion.

15. The sliding apparatus of claim 11, wherein the rail is bent at an end portion thereof in a direction that intersects a longitudinal direction of the rail, and the movable member moves along the bent rail.

* * * * *